US010705902B2

(12) United States Patent
Sasidharan et al.

(10) Patent No.: US 10,705,902 B2
(45) Date of Patent: Jul. 7, 2020

(54) CRASH LOG STORAGE AND RETRIEVAL USING BOOT PARTITIONS IN SOLID STATE SYSTEMS

(71) Applicant: Western Digital Technologies, Inc., San Jose, CA (US)

(72) Inventors: Vinod Sasidharan, Bangalore (IN); Rishabh Mahajan, Delhi (IN); Abhishek Mourya, Bangalore (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 138 days.

(21) Appl. No.: 15/970,435

(22) Filed: May 3, 2018

(65) Prior Publication Data
US 2019/0340058 A1 Nov. 7, 2019

(51) Int. Cl.
*G06F 11/07* (2006.01)
*G06F 3/06* (2006.01)
*G06F 9/4401* (2018.01)

(52) U.S. Cl.
CPC ........ G06F 11/0778 (2013.01); G06F 3/0619 (2013.01); G06F 3/0665 (2013.01); G06F 3/0679 (2013.01); G06F 9/4401 (2013.01); G06F 11/079 (2013.01); G06F 11/0787 (2013.01); *G06F 2213/0026* (2013.01)

(58) Field of Classification Search
CPC ............... G06F 11/0787; G06F 11/079; G06F 11/0748; G06F 11/0757; G06F 11/0778; G06F 9/5077; G06F 9/441; G06F 9/4401
See application file for complete search history.

(56) References Cited

U.S. PATENT DOCUMENTS 8,589,730 B2    11/2013 Byom et al.
8,762,703 B2*   6/2014 Galbo .................. G06F 9/4401
                                                    711/173
(Continued)

OTHER PUBLICATIONS

NVM Express; "Non-Volatile Memory Express" Revision 1.3a, dated Oct. 24, 2017; 287 pages.
(Continued)

*Primary Examiner* — Nadeem Iqbal
(74) *Attorney, Agent, or Firm* — Loza & Loza, LLP; Gabriel Fitch

(57) ABSTRACT

The present disclosure describes technologies and techniques for use by a data storage controller—such as a controller for use with a NAND or other non-volatile memory (NVM)—to store crash-dump information in a boot partition following a system crash within the data storage controller. Within illustrative examples described herein, the boot partition may be read by a host device without the host first re-installing valid firmware into the data storage controller following the system crash. In the illustrative examples, the data storage controller is configured for use with versions of Peripheral Component Interconnect (PCI) Express—Non-Volatile Memory express (NVMe) that provide support for boot partitions in the NVM. The illustrative examples additionally describe virtual boot partitions in random access memory (RAM) for storing crash-dump information if the NAND has been corrupted, where the crash-dump information is retrieved from the RAM without power-cycling the RAM.

25 Claims, 10 Drawing Sheets

(56) References Cited

U.S. PATENT DOCUMENTS

| | | | |
|---|---|---|---|
| 8,943,226 B1* | 1/2015 | Hoglund | G06F 3/0659 |
| | | | 710/11 |
| 9,728,277 B2 | 8/2017 | Lee et al. | |
| 9,734,015 B2 | 8/2017 | Herzi et al. | |
| 10,055,377 B2* | 8/2018 | Rupanagunta | G06F 13/4295 |
| 2015/0128000 A1* | 5/2015 | Jung | G06F 11/2268 |
| | | | 714/723 |
| 2015/0199201 A1* | 7/2015 | Lim | G06F 11/0793 |
| | | | 713/2 |
| 2016/0139995 A1 | 5/2016 | Takami | |
| 2017/0242820 A1* | 8/2017 | Rupanagunta | G06F 13/4282 |
| 2017/0269857 A1 | 9/2017 | Kundu et al. | |
| 2017/0315891 A1* | 11/2017 | Park | G11C 29/883 |
| 2019/0179694 A1* | 6/2019 | Park | G06F 11/0787 |

OTHER PUBLICATIONS

Gottscho et al, "Measuring the Impact of Memory Errors on Application Performance"; IEEE Computer Architecture Letters, vol. 16, Issue 1; Aug. 2016; DOI 10.1109/LCA.2016.2599513; http://ieeexplore.ieee.org/document/7542148/.

* cited by examiner

CRASH LOG STORAGE AND RETRIEVAL USING BOOT PARTITIONS IN SOLID STATE SYSTEMS

FIELD

The subject matter described herein relates to data storage devices and controllers. More particularly, the subject matter relates, in some examples, to the handling of crash-dump information within data storage controllers for use with non-volatile memory (NVM) devices.

INTRODUCTION

Fatal system crashes can occur in the firmware of data storage systems, such as within the firmware of solid state drive (SSD) systems configured in accordance with Peripheral Component Interconnect (PCI) Express—Non-Volatile Memory express (NVMe). Such crashes may occur, for example, from data structure corruption or from faulty firmware algorithms, the errors of which were undetected during product testing.

Issues can arise within SSDs involving the storage and retrieval of information pertaining to system crashes and it would be desirable to provide solutions to such issues.

SUMMARY

One embodiment of the present disclosure provides a method for use by a data storage system having data storage controller and a non-volatile memory (NVM) device, including: detecting a failure within the data storage system; storing failure information representative of the failure within a boot partition area of the NVM device and/or within a virtual boot partition area of a random access memory (RAM) of the data storage controller; determining a location from which to transfer the stored failure information, the location being the boot partition area of the NVM device and/or the virtual boot partition area of the RAM; and transferring the stored failure information to a host device based on the determination.

Another embodiment of the present disclosure provides a data storage system for use with a host device, where the data storage system includes: a non-volatile memory (NVM) device; and a data storage controller having a processing system configured to detect a failure within the data storage system, store failure information representative of the failure within at least one of a boot partition area of the NVM device and a virtual boot partition area of a random access memory (RAM) of the data storage controller, determine a location from which to transfer the stored failure information, the location being at least one of the boot partition area of the NVM device and the virtual boot partition area of the RAM, and transfer the stored failure information to a host device based on the determination.

Yet another embodiment of the present disclosure provides a data storage system for use with a host device including: a NVM device and a controller. The controller includes a RAM, a failure detection detector configured to detect a failure within the data storage system, a failure-responsive data storage controller configured to store failure information representative of the failure within a boot partition area of the NVM device and/or a virtual boot partition area of the RAM, a determination component configured to determine a location from which to transfer the stored failure information, the location being the boot partition of the NVM device and/or the virtual boot partition of the RAM, and a transference controller configured to transfer the stored failure information to a host device based on the determination made by the determination component.

Still yet another embodiment of the present disclosure provides an apparatus for use with a data storage system, including: means for detecting a failure within the data storage system; means for storing failure information representative of the failure within at least one a boot partition area of the NVM device and a virtual boot partition area of a random access memory (RAM); means for determining a location from which to transfer the stored failure information, the location being at least one of the boot partition area of the NVM device and the virtual boot partition area of the RAM; and means for transferring the stored failure information to a host device based on the determination.

BRIEF DESCRIPTION OF THE DRAWINGS

The subject matter described herein will now be explained with reference to the accompanying drawings of which.

DETAILED DESCRIPTION

Figure 1:
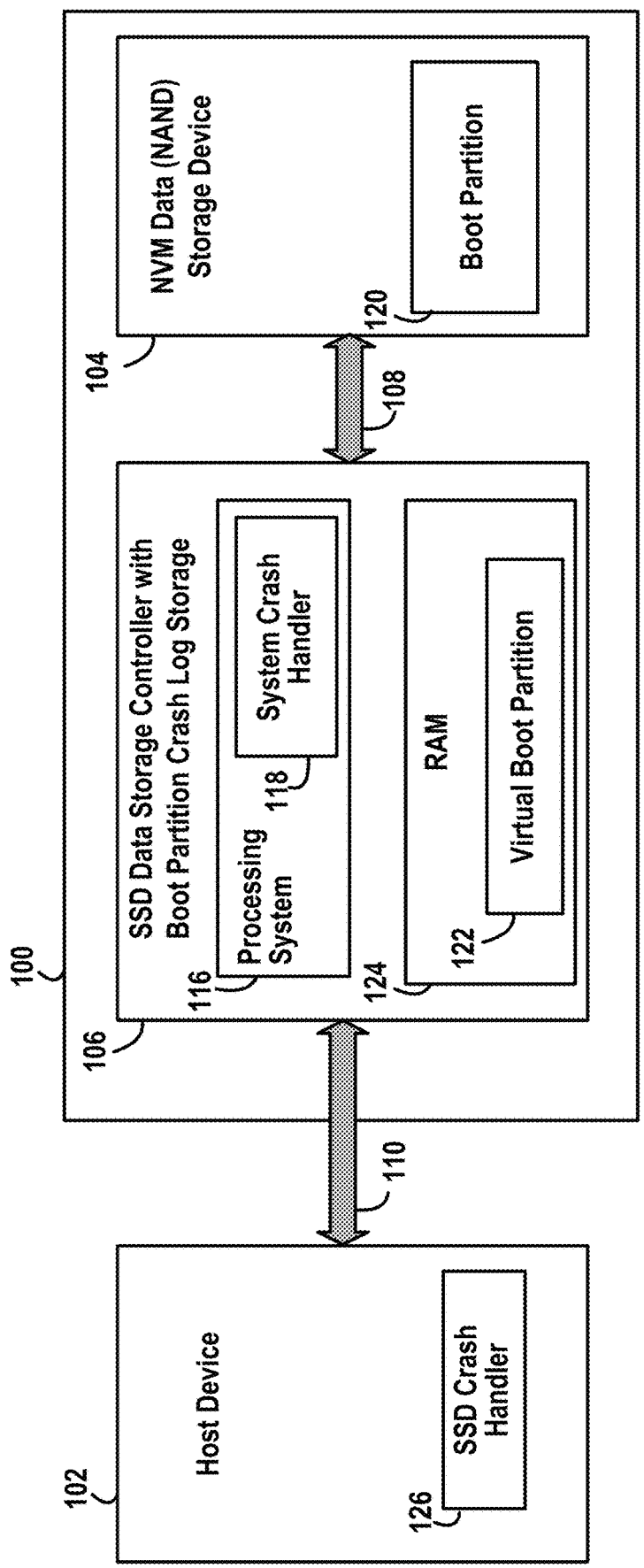
FIG. 1 illustrates a data storage system having a data storage controller and an NVM data storage device (such as a NAND), where the data storage controller is equipped to store crash-dump information in boot partitions.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Overview

Aspects of the present disclosure provide various apparatus, devices, systems and methods for use by solid state drive (SSD) or flash data storage systems. The main examples herein relate to removable non-volatile memory (NVM) storage systems configured for use with Peripheral Component Interconnect (PCI) Express—Non-Volatile Memory express (NVMe), wherein an NVM data storage controller (i.e. a device controller) is configured to control access by a host device to an NVM device such as a NAND storage element using NVMe protocols. See, the NVM Express standard, Revision 1.3a, Oct. 24, 2017. However, aspects described herein are applicable to other data storage systems or protocols.

As noted in the Introduction Section above, system crashes can occur within an SSD system. Components within the data storage controller of the SSD may be configured to collect system crash information in the form of crash logs and save the information (i.e. "dump" the information) to the NVM of the device, such as to a NAND memory component, for subsequent analysis. The crash handling components of the data storage controller may be configured to store the crash-dump information using an internal file system within the NAND. Upon detecting that the SSD suffered a system crash, a host device might attempt to retrieve the crash-dump information from the NAND. However, retrieval may require the SSD to first install valid firmware in the controller of the SSD (as opposed to the faulty firmware that may have caused the system crash). This requirement may present various issues.

For example, if the data storage controller of the SSD is unable to download and install replacement firmware, the host device will not be capable of retrieving the crash-dump information. Such may occur if the host device does not have a replacement firmware image to load into the SSD or if errors or defects in the SSD prevent the data storage controller of the SSD from installing the replacement firmware. Furthermore, if the replacement firmware also has errors, it might not be capable of retrieving the crash-dump information on behalf of the host device (even if properly installed). Indeed, the replacement firmware may itself trigger yet another system crash. Moreover, if the error that triggered the initial system crash arose in the NAND, particularly within the internal file system of the NAND, the NAND might not be capable of storing the crash-dump information, and hence there will be no stored crash-dump information for the host to retrieve.

These and other issues may be addressed within PCIe-NVMe SSD systems (or similar systems) by storing crash-dump information within a boot partition area of the NAND, which can be retrieved by a host device using a PCIe-NVMe bootloader without first loading valid replacement firmware into the data storage controller of the SSD, i.e. while the data storage controller still includes a version of firmware associated with the failure. (Boot partitions provide an area within the NVM that can be read without the host initializing queues or enabling the controller.) The crash-dump information may also be stored within a virtual boot partition within a random access memory (RAM) of the data storage controller. Since a host device can access the boot partition area of the NAND using PCIe-NVMe without valid firmware installed in the SSD, the aforementioned problems that might arise when installing or running replacement firmware in the data storage controller are thus avoided. By additionally storing crash-dump information within a virtual boot partition within RAM, the crash-dump information is available to the host device even if an error occurred in the NAND that prevents the NAND from storing the information. Notably, crash-dump information stored in the RAM of the SSD should be retrieved by the host device without power cycling the RAM (i.e. without turning off the power to the RAM of the SSD, which would erase the crash-dump information). As long as the RAM is not power cycled, the PCIe-NVMe bootloader can retrieve the crash-dump information from the virtual boot partition of the RAM without valid replacement firmware first being installed in the data storage controller of the SSD.

Exemplary Data Storage Controller Embodiments

FIG. 1 illustrates, at a high level, an SSD data storage system 100 configured to control access to an NVM data storage device (such as a NAND) 104 by a host device 102. For a NAND write operation, the data storage system 100 receives data from the host device 102 and stores the data in the data storage device 104 under the control of an SSD data storage controller 106 (which may also referred to as a memory controller or device controller). Data and commands may be routed between the data storage controller 106 and the data storage device 104 along an internal bus 108. Data and commands may be routed between the host device 102 and the data storage controller 106 along an external bus 110. These operations may be performed under the control of a processor or processing system 116. In addition to controlling the reading/writing of data from/to the NAND 104, the data storage controller 106 controls the generation of crash logs in the event of a system crash in the data storage system 100. In the example of FIG. 1, the processing system 116 includes a system crash handler 118 that generates crash logs or other crash-dump information and stores the information in a boot partition 120 within the NAND 104 and also within a virtual boot partition 122 within a RAM 124 of the data storage controller 106. In some examples, the system crash handler 118 detects where the crash occurred (e.g. in the internal file system of the NAND 104 or in the firmware of the data storage controller 106), and then only stores the crash-dump information in the virtual boot partition 122 of the RAM 124 if the error occurred in the NAND, and instead stores the crash-dump information in the boot partition 120 of NAND 104 otherwise. In other examples, the system crash handler 118 attempts to store the information in both the boot partition 120 of the NAND 104 and the virtual boot partition 122 of the system RAM 124.

FIG. 1 also illustrates an SSD crash handler 126 within the host device 102, which is activated when the host device 102 is notified (or otherwise determines) that a system crash has occurred in the SSD data storage system 100. Such a crash status notification may be provided, for example, by the system crash handler 118 of the SSD data storage system 100 via appropriate signals sent along bus 110. The SSD crash handler 126 of the host device 102 then retrieves the crash-dump information from either the virtual boot partition 122 of the RAM 124 or from the boot partition 120 of NAND 104 using, for example, NVMe boot partition access procedures described below (if the SSD data storage device 100 is configured in accordance with NVMe) and using other suitable procedures (for use in other, different systems that also allow access to a boot partition). The SSD crash handler 126 may then analyze the crash-dump information in an effort to determine the source of the error. In some instances, the host device 102 may be capable of fixing the problem, particularly if a firmware upgrade is available for a known error. In some cases, the host device 102 downloads replacement firmware and loads the replacement firmware into the data storage device 100 to thereby fix the problem that caused the system crash. In other cases, the host device 102 may output the crash-dump information for analysis by engineers or system designers, who may then analyze the data to identify the problem and, if needed, design new firmware for loading into the SSD data storage device 100 that crashed and all similar devices that are already deployed.

Figure 2:
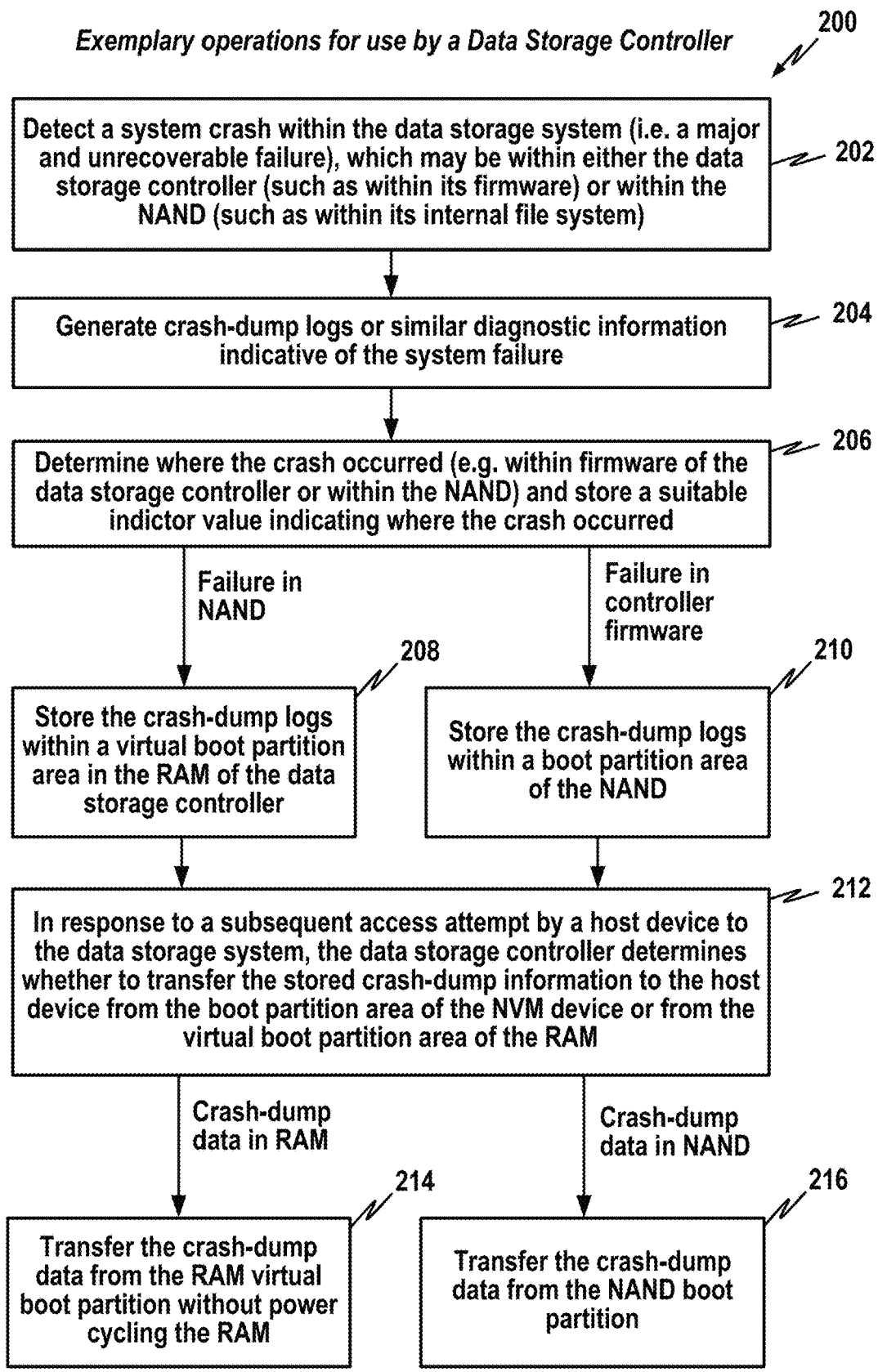
FIG. 2 is a flow chart summarizing the operations of the data storage controller to store crash-dump information in boot partitions and to subsequently retrieve the crash-dump information from the partitions for transference to a host device, without the need to install valid firmware in the controller before transferring the crash-dump information.

FIG. 2 summarizes some of these features via a flowchart 200 that illustrates operations of the data storage controller. Briefly, at 202, the data storage controller detects a system crash (i.e. a major and unrecoverable failure) within the data storage system, which may occur within either the data storage controller (such as within its firmware) or within the NAND (such as within its internal file system). At 204, a crash handler within the data storage controller (such as a boot ROM code handler) generates crash-dump logs or similar diagnostic information indicative of the failure. At 206, the crash handler of the data storage controller determines where the crash occurred (e.g. within firmware of the data storage controller or within the NAND). At 208, if the crash occurred in the data storage controller, the crash handler stores the crash-dump logs within a boot partition area of the NVM device. At 210, if the crash occurred in the NAND, the crash handler stores the crash-dump logs within a virtual boot partition area of the system RAM. In some examples, the crash handler may store the data in both areas (or at least attempt to store the data in both areas). The crash handler also saves an indicator value (such as a flag) to indicate where the crash-dump data has been stored.

Later, at 212, in response to an attempted access by the host device to the data storage system (or immediately if the system crash occurred while the data storage controller was already communicating with the host device), a boot ROM code handler or other suitable component of the data storage controller determines whether to transfer the stored crash-dump information to the host device from the boot partition area of the NVM device or from the virtual boot partition area of the RAM by, for example, retrieving and examining the stored flag indicating where the crash-dump data was stored. At 214, if the crash-dump data was stored in RAM, the boot ROM code handler (or other suitable component of the data storage system) then transfers the crash-dump logs or other diagnostic information to the host device from the RAM virtual boot partition without power cycling the RAM. Alternatively, at 216, if the crash-dump data was stored in NAND, the boot ROM code handler (or other suitable component of the data storage system) transfers the crash-dump logs or other diagnostic information to the host device from the NAND boot partition. That is, transferring the stored failure information to the host device includes transferring the failure information, if the data storage controller has not lost power since the information was stored in the virtual boot partition area of the RAM, from the virtual boot partition area of the RAM to the host device. For NVMe Revision 1.3 applications (or for other suitable versions of the NVMe standard), boot partition read procedures specified in the standard may be employed. Following blocks 214 and 216, the host device may attempt to automatically fix the data storage system by, e.g., downloading and installing replacement firmware in the data storage system or taking other appropriate actions.

Figure 3:
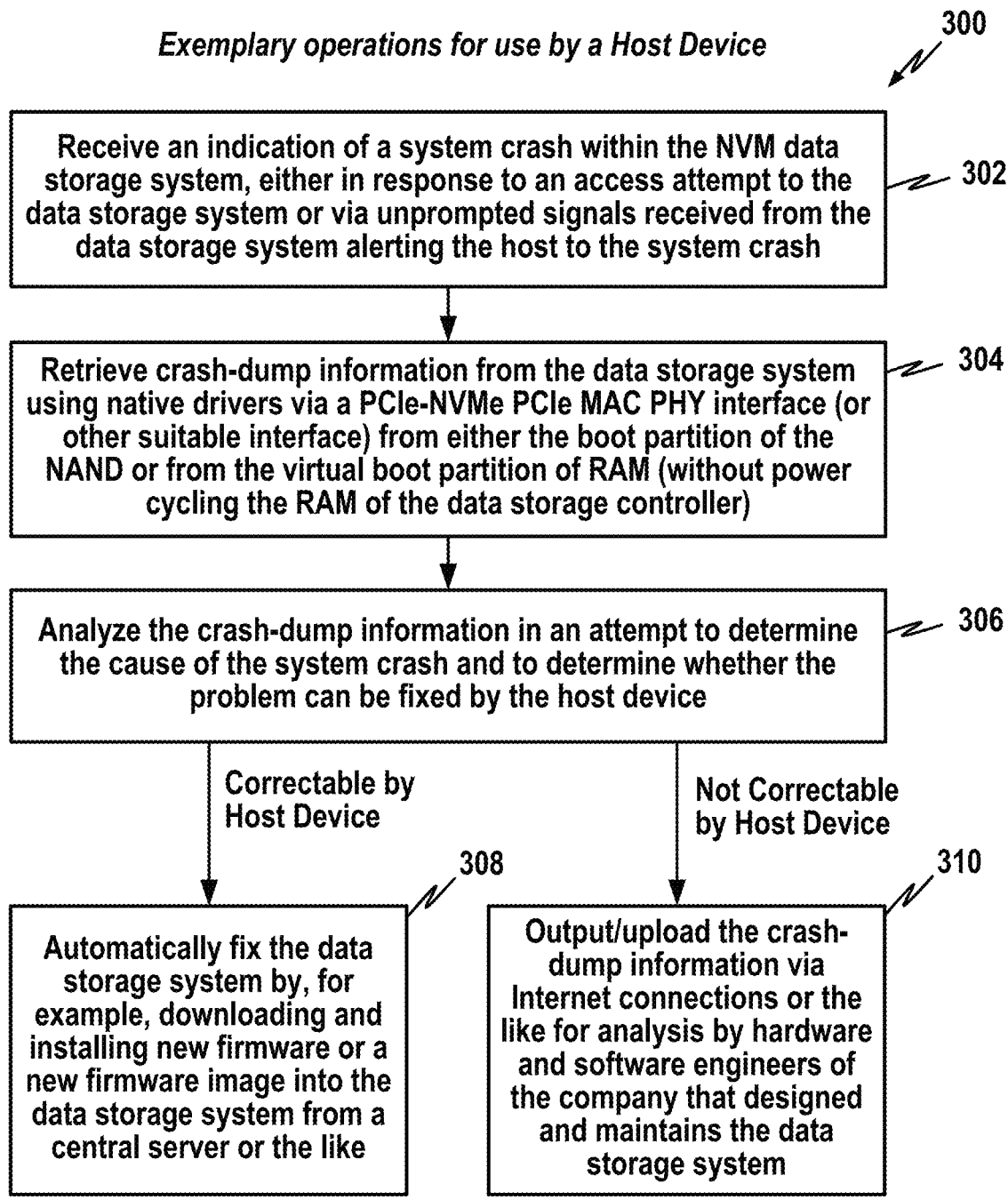
FIG. 3 is a flow chart summarizing the operations of the host device to retrieve the crash-dump information from the boot partitions, also without the need to install valid firmware in the data storage controller before reading the crash-dump information.

FIG. 3 summarizes some of operations of the host device via a flowchart 300. Briefly, at 302, the host device receives an indication of a system crash within an NVM data storage system that is connected to the host device, with the indication of the system crash being received either in response to an access attempt by the host device to the data storage system (such as a failed attempt to write data to the NVM) or via unprompted signals received from the data storage system alerting the host to the system crash. At 304, the host device retrieves crash-dump information or other diagnostic data from the data storage system using native drivers via a PCIe-NVMe PCIe MAC PHY interface (or other suitable interface, where appropriate) from either the boot partition of the NAND of the data storage system or from the virtual boot partition of the RAM of the data storage system (without power cycling the RAM of the data storage controller).

At 306, the host device analyzes the crash-dump information in an attempt to determine the cause of the crash and to determine whether the problem can be fixed by the host device. If the problem is correctable by the host device, then, at 308, the host device fixes the data storage system by, for example, downloading new (or replacement) firmware and/or a new (or replacement) firmware image into the data storage system from a central server or the like and installing the firmware in the data storage controller of the SSD. This is often feasible if a particular firmware defect or bug has already been identified by engineers of the data storage system and new firmware already has been written (which can be downloaded by the host device and installed in the data storage system). Conversely, if the problem is not correctable by the host device, the host device, at 310, outputs or uploads the crash-dump information via Internet connections or the like for analysis by hardware and software engineers of the company that designed and maintains the data storage system. Once new firmware has been prepared that fixes the problem, the host device can then download and install the fix. It is noted that in some cases, such as because of a physical failure within the data storage system (e.g. a burned-out circuit), the data storage system cannot be fixed and must be replaced.

Figure 4:
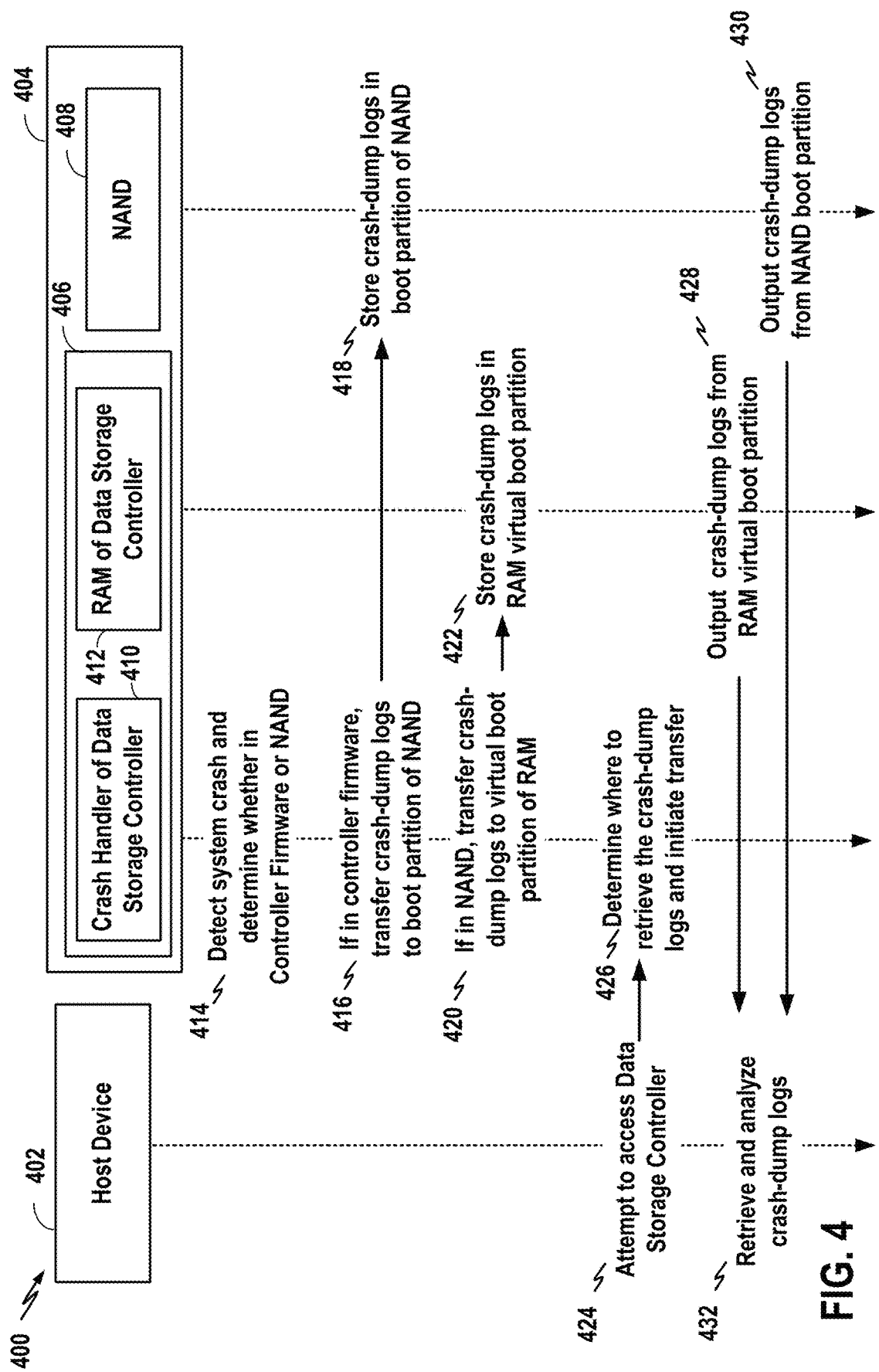
FIG. 4 is a timing diagram summarizing exemplary procedures for use by a data storage system and a host device for storing and retrieving crash-dump information.

FIG. 4 provides a timing diagram 400 illustrating an exemplary sequence of operations performed by components of an overall computing system that includes a host device 402 and a data storage system 404, where the data storage system 404 includes a data storage controller 406 and a NAND 408. The data storage controller 406 includes a crash handler 410 or other suitable component for detecting system crashes and for controlling the generation, storage and retrieval of crash-dump logs and the like. The data storage controller 406 also includes a RAM 412. As already explained, the RAM of the data storage controller may be configured to include a virtual boot partition (as shown in FIG. 2) and the NAND may be configured to include a (non-virtual) boot partition (also shown in FIG. 2).

Beginning at 414, the crash handler 410 of the data storage controller 406 detects a system crash and determines whether the failure occurred in firmware of the data storage controller or in the NAND. If the failure was in controller firmware, the crash handler 410, at 416, transfers crash-dump logs to the boot partition of the NAND. The NAND 408 then stores, at 418, the crash-dump logs in its boot partition. If the crash instead occurred in the NAND, the crash handler 410, at 420, transfers crash-dump logs to a virtual boot partition of the RAM 412 and the RAM, at 422, stores the crash-dump logs in its virtual boot partition. As already mentioned, the data storage controller may be configured to store (or attempt to store) the crash-dump data in both the RAM and the NAND.

At 424, the host device 402 attempts to access the data storage controller (by sending signals via an intervening bus, not shown). Such an access attempt may occur, for example, when the data storage system 404 is inserted into the host device (assuming the data storage system 404 is removable) or when the host device attempts to boot up an internal data storage system (assuming the data storage system is an internally installed component of the host device). At 426, the data storage controller 406 determines where to retrieve crash-dump logs and initiates the data transfer. Depending upon how the data storage controller 406 is configured, the determination may be made by the same crash handler that originally stored the crash-dump data or by another suitable component, such as a ROM boot handler. At 428, if the crash-dump logs were stored in RAM, the RAM outputs the crash-dump logs from its RAM virtual boot partition to the host device (via an intervening bus, not shown). At 430, if the crash-dump logs were stored in NAND, the NAND 408 outputs the crash-dump logs from its boot partition to the host device (again via an intervening bus, not shown). At 432, the host device retrieves and analyzes the crash-dump logs and, as already noted, the host device may attempt to fix the data storage system by, for example, installing new firmware in the data storage system or taking other appropriate actions. Note that, depending upon the circumstances, the retrieval of the crash-dump logs and the transference of the logs to the host device (at 426, 428, and 430) may be performed automatically (unprompted) by the data storage controller without the host first attempting to access the data storage system (as may occur if the system crash occurs while the data storage controller is already communicating with the host device, e.g. while reading/writing data to the NAND on behalf of the host device).

Figure 5:
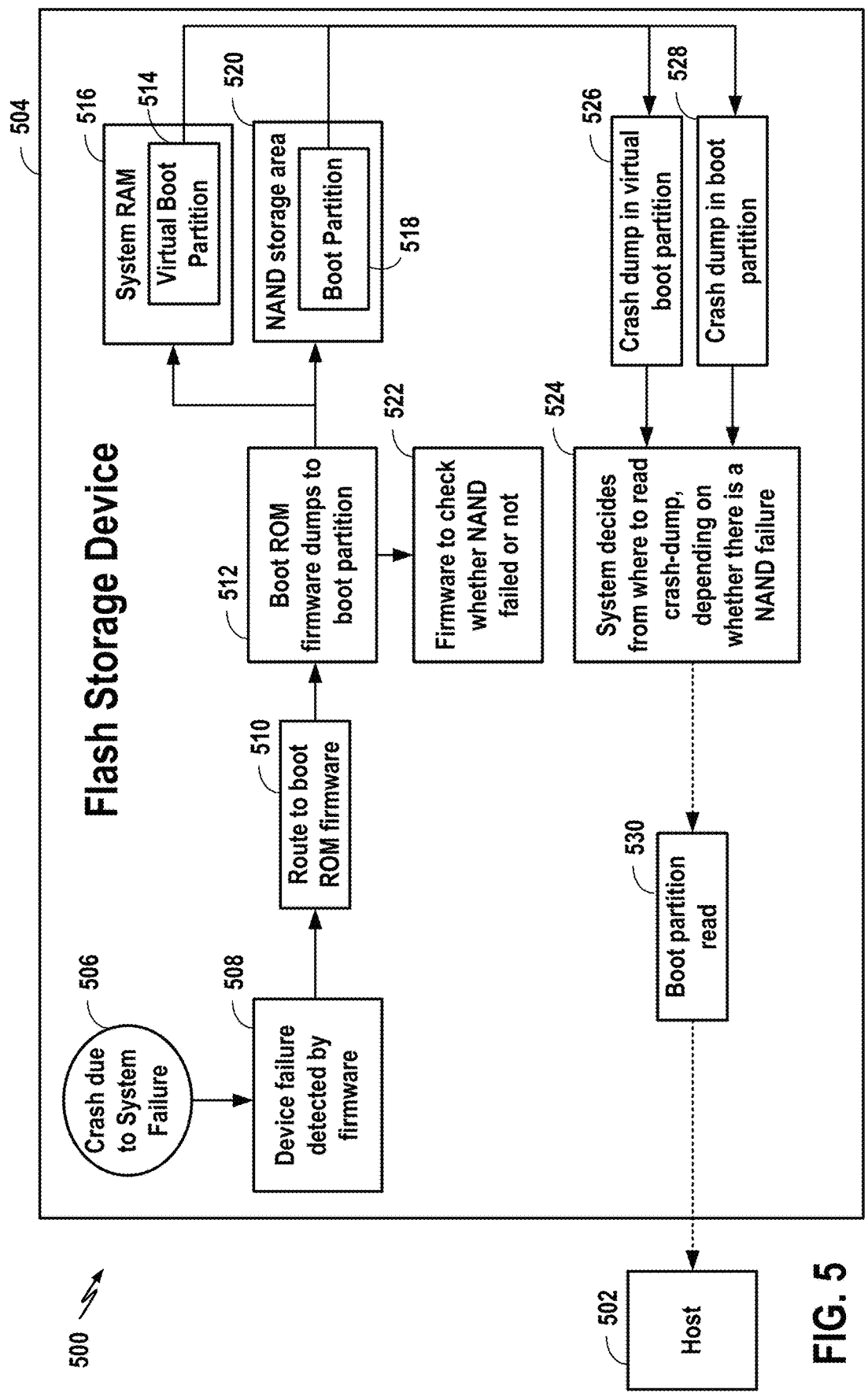
FIG. 5 illustrates a flash storage device and several of its components, including a boot partition NAND storage area and a virtual boot partition storage area in system RAM.

FIG. 5 illustrates these and other exemplary features within a computing or processing system 500 having a host 502 and a flash storage device 504. This particular figure illustrates both functions and device components. At 506, a crash or major operational failure occurs within the flash storage device 504. The device failure is detected by firmware, at 508. At 510, an indication of the failure is routed to ROM firmware. At 512, the boot ROM firmware generates crash-dump logs or other diagnostic information and dumps the information to (at least one) boot partition. As shown, the information may be dumped to a virtual boot partition 514 of system RAM 516 and/or to a (non-virtual) boot partition 518 of a NAND storage area 520. These operations may be performed in conjunction with a determination made using firmware at 522 as to whether the NAND failed. For example, the boot ROM firmware of the flash storage device 504 may choose to dump the crash logs to the virtual RAM boot partition 514 if the NAND failed and to dump the information to the boot partition 518 in the NAND if the NAND did not fail (or to store the information in both areas, if feasible).

At 524, in response to an attempt to access the flash storage device 504 by the host 502, or automatically (when appropriate), components of the flash storage device, such as the boot ROM firmware, decides from where to read the crash-dump information, depending on whether or not there was a NAND failure. The crash-dump information is obtained, at 526, from the virtual boot partition 514 (if the failure was in the NAND) or is obtained, at 528, from the boot partition 518 in the NAND 520 (otherwise). During a boot partition read 530, the crash-dump information is transferred to the host 502. As already explained, the host may then attempt to automatically fix the storage device (by, for example, downloading and installing new firmware) or the host uploads the crash-dump information to centralized servers for analysis by engineers or other personnel of the company that designed the flash device.

Exemplary NVMe Embodiments

Figure 6:
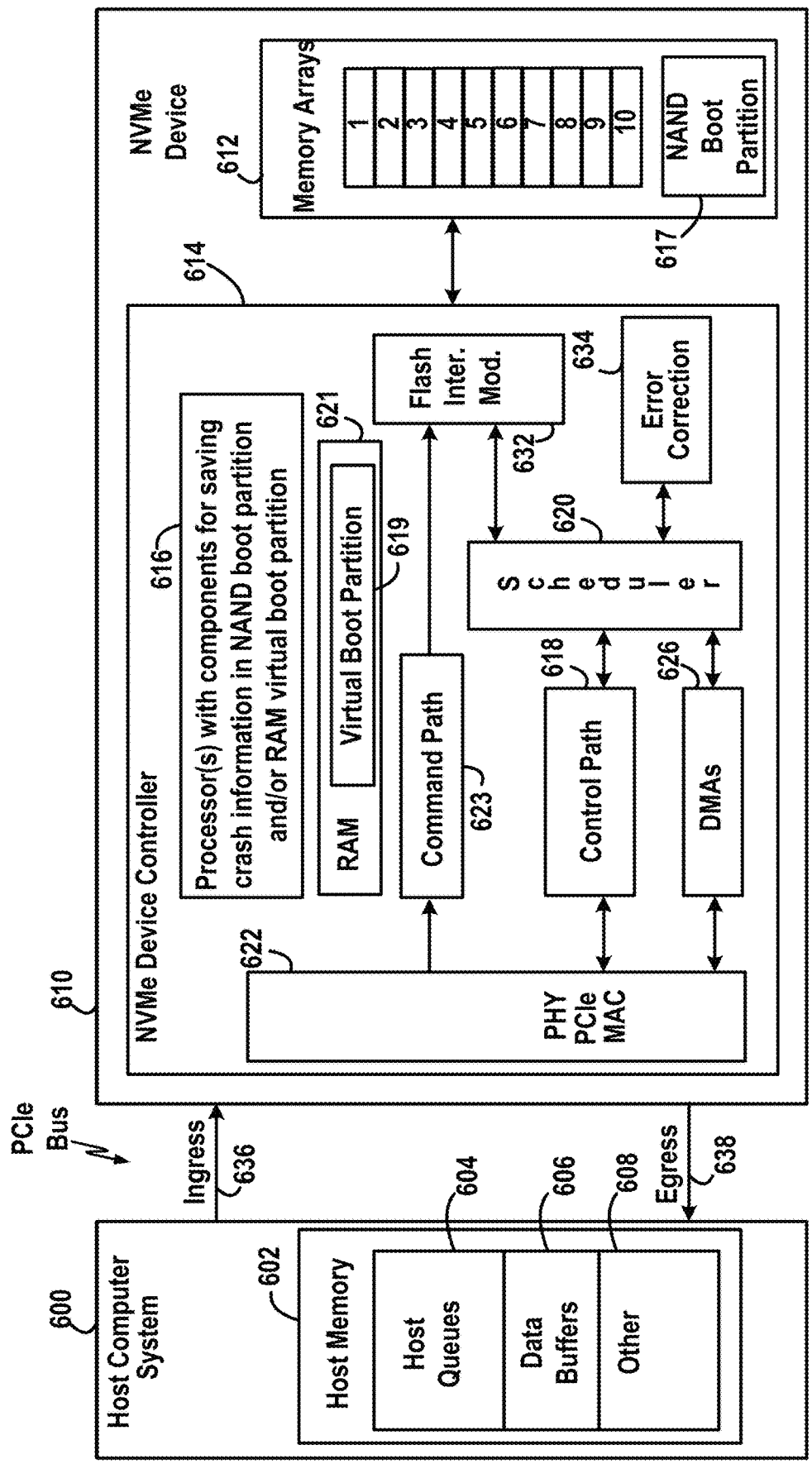
FIG. 6 illustrates a data storage system equipped for use with NVMe, where the system includes a NAND boot partition and a RAM virtual boot partition.

FIG. 6 illustrates selected features of an exemplary NVMe architecture in which the above-described procedures and components may be implemented. In FIG. 6, a host device 600 may be any suitable computing platform capable of accessing memory on a storage device using NVMe procedures that provide for a boot partition (such as NVMe Revision 1.3 or compatible NVMe Revisions or Versions). For example, host device 600 may be a desktop personal computer, a laptop computer, a tablet computer, a mobile telephone, or a front end to a storage array. The host device 600 includes internal host memory 602, which in this example includes host submission and completion queues 604, data buffers 606 and other memory components 608. The host device 600 may store data in an NVMe storage device 610. The NVMe device 610 may be any suitable device that provides non-volatile memory storage for host device 600 in accordance with NVMe standards. For example, the NVMe device 610 may be a removable storage device, such as an SSD that is removably connectable to host device 600. In another example, the NVMe device 610 may be non-removable or integrated within the host device 600. The host device 600 and the NVMe device 610 of FIG. 6 are communicatively connected via a PCIe bus (represented via ingress 636 and egress 638).

The NVMe storage device 610 of FIG. 6 includes an NVMe controller 614 and a non-volatile memory 612. The NVMe device controller 614 (which may also be referred to herein as a data storage controller) controls access to the non-volatile memory 612 (such as a NAND). The NVMe controller 614 thus may be a non-volatile memory controller that implements or supports the NVMe protocols, and non-volatile memory 612 may be 2D or 3D NAND flash memory. The NVMe controller 614 includes one or more processors 616 that include components for saving crash information in a NAND boot partition 617 and/or a RAM virtual boot partition 619 of a RAM 621. (Although not shown, separate ROM may be used to store software and/or firmware including boot load firmware, crash handling firmware, etc.). The processor(s) 616 are also responsible for the execution of Frond-End and Back-End tasks.

A command path 623 is responsible for fetching and parsing commands from the host 600 and queuing the commands internally (during normal use, i.e. in the absence of any system crash or major failure of the NVMe device 610). Fetching and parsing may involve obtaining submission requests from a submission queue of the host queues 604 and routing those requests to a flash interface module 632. In addition, the command path 623 is responsible for the arbitrating and executing the commands. A control path 618 is responsible for handling control messages delivered from the host 600 to the device 610 and vice versa. Among other functions, the control path 618 includes a completion queue manager (not shown) that routes completion entries received from a scheduler 620 to a completion queue within host queues 604 of the host device 600 via the PCIe MAC PHY interface 622. Actual pages of data to be delivered to the host device 600 (such as the result of read commands from arrays 612) are delivered using one or more DMAs 626. Additional components of the NVMe controller 614 include the flash interface module 632, which is responsible for controlling and accessing the memory arrays 612, and an error correction module 634, which is responsible for error correction. Ingress and egress from the NVMe device 610 is illustrated via arrows 636 and 638.

Note that, in an exemplary implementation, the only components that are modified relative to a standard NVMe Revision 1.3 device controller (or compatible NVMe Versions or Revisions) are the processor(s) 616 (as well as the software/firmware associated with the processors 616) and the RAM (which may be modified to provide the virtual boot partition 619). The crash handling procedures described herein that serve to save crash information in boot partitions are otherwise transparent to all other components of the NVMe device 610, as well as to the host device 600. That is, only minimal changes are made to otherwise standard NVMe Revision 1.3 systems to implement boot partition crash handing.

As explained in NVMe Revision 1.3, a boot partition (which is an optional feature of the specification) provides an area of NVM storage that can be read without the host device initializing queues (such as submission or completion queues) or enabling the data storage controller. The boot partition is a continuous block of data. A simplified interface is provided to access the boot partition for use with platform initialization code (e.g., a bootloader executed from host ROM) to boot to a pre-operating system (OS) environment rather than storing the image on another storage medium (e.g., a serial peripheral interface (SPI) flash). Two boot partitions of equal size are specified. With two boot partitions, the host device may update one and verify the contents before marking the boot partition as active. With NVMe Revision 1.3, the contents of boot partitions are modified, for example, using Firmware Commit commands.

Figure 7:
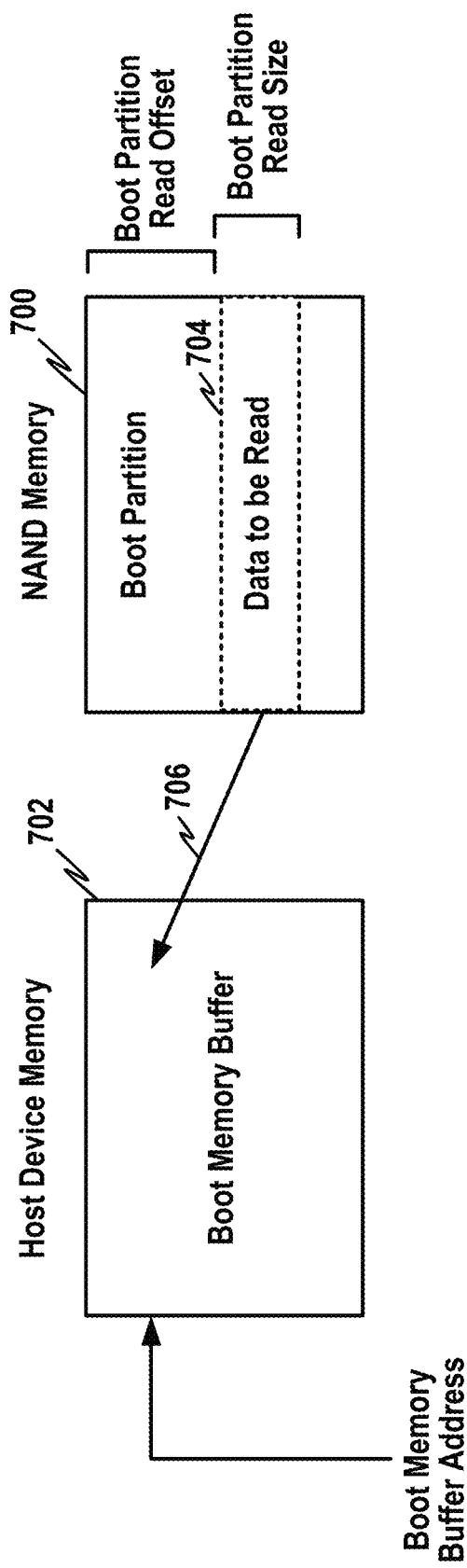
FIG. 7 illustrates NAND memory and host memory, where the NAND memory includes a boot partition with data to be read by the host device.

FIG. 7 illustrates an exemplary NVMe boot partition 700, along with a boot memory buffer 702 of host memory. The boot partition 700 includes data 704 to be read, which can be transferred (as shown by arrow 706) into the boot memory buffer 702 to a particular boot memory buffer address. The figure also shows a boot partition read offset and the boot partition read size. As described in NVMe Revision 1.3, the host device allocates the boot memory buffer 702 in host memory for the data storage controller to copy contents from the boot partition 700 (so as to read the contents of the boot partition). The read proceeds with the host (a) initializing a Boot Partition Memory Buffer Base Address and then (b) setting a Boot Partition ID, Boot Partition Read Size, and Boot Partition Read Offset to initiate the Boot Partition read operation. The host device may read from the boot partition 700 until the entire boot partition has been read. A portion of the boot partition 700 may be read by the host any time the NAND is powered (i.e., whether or not the data storage controller connected to the NAND is enabled). Note that, in accordance with the NVMe Revision 1.3 specifications, the host device does not (and, indeed, shall not) modify any PCIe registers, nor reset or shutdown the device controller while a boot partition read is in progress. Additional details of a boot partition read are provided in Section 8.13.1 of the NVMe Revision 1.3 document, cited above. Procedures for writing to the boot partition are described in Section 8.13.2 of the document and the write procedures may be exploited or modified, as appropriate, to allow the data storage controller to write crash-dump data to the boot partition.

Note that in an implementation where the data storage system is a removable PCIe-NVMe storage device, if the data storage system crashes, the failure most likely would be within an assert handler or in a boot ROM code handler. A watchdog reset might also occur, which can be used to route control to crash-dump routines. The crash-dump routines, which could be implemented in a boot ROM as well, may then store the crash-dump data in the NVMe boot partition area specified for the crash-dump data allocation in NAND flash memory. In parallel or in the alternative, the crash-dump data can be stored in the aforementioned virtual boot partition in RAM as well, in scenarios where non-volatile NAND flash is not accessible.

As already explained, the host device can read the crash logs from the boot partition area directly by using NVMe boot partition read methods (as discussed in NVMe Revision 1.3). The boot ROM code handler may provide the data to host device for boot partition read through the RAM virtual boot partition if no power cycle has occurred, or from the actual boot partition allocated in NAND flash. The host device may read the boot partition without a power cycle so the crash-dump data can be retrieved from the RAM-based virtual partition, even if there is a critical NAND failure. Hence, no separate temporary firmware image download is required for retrieval of crash-dump data in the event of failure of the actual firmware image. Moreover, when using the NVMe boot partition to retrieve crash-dump data, no device-specific proprietary diagnostic commands are required, as the data storage controller makes use of the boot partition read feature of NVMe, which is natively supported by the host drivers.

Thus, systems and procedures have been described that exploit an NVMe boot partition or similar partitions or techniques to permit a host device to retrieve crash-dump information or the like. Among other possible advantages, and depending upon the particular embodiment, these systems and procedures allow for a host device to directly read crash-dump information using a PCIe layer, without downloading new or replacement firmware or a new or replacement firmware image. In cases where a logical-to-physical data structure table in a flash translation layer (FTL) of a flash drive is corrupted (in such a way to cause the flash drive system to crash), the systems and procedures herein allow the host device to read crash-dump information from the boot ROM mode itself. These systems and procedures may be deployed in an original equipment manufacturer (OEM) environment where a host team (i.e. the engineers working for the company that designs or maintains the host device) may then easily provide the crash-dump data to a device team (i.e. the engineers working for the company that designs or controls the data storage device) for prompt analysis. These procedures also may be deployed in controlled environments by the device team itself (e.g. within the engineering labs of the company that designs and maintains the storage device). Generally speaking, the ability to use native commands (e.g. commands within host drivers) rather than separate device-specific diagnostic commands for crash dump-data retrieval can be advantageous as well.

These systems and procedures may be particularly useful within removable data storage devices equipped for PCIe-NVMe, but aspects of the systems and procedures might be exploited in non-removable storage devices as well, and in devices that do not use PCIe-NVMe.

Further Exemplary Methods and Embodiments

Figure 8:
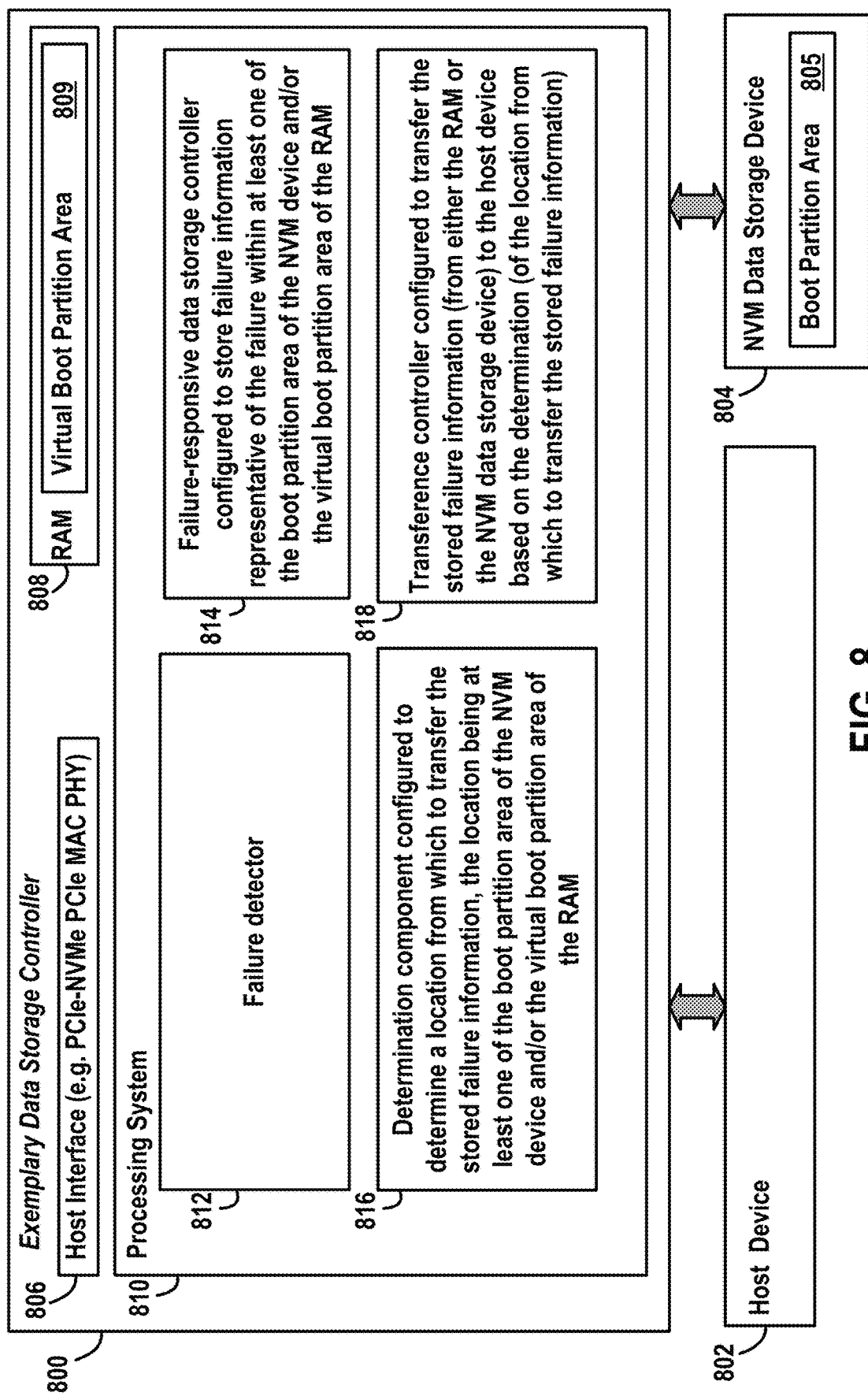
FIG. 8 is a block diagram summarizing selected features of a data storage controller configured to store system failure information in one or more boot partitions.
Figure 9:
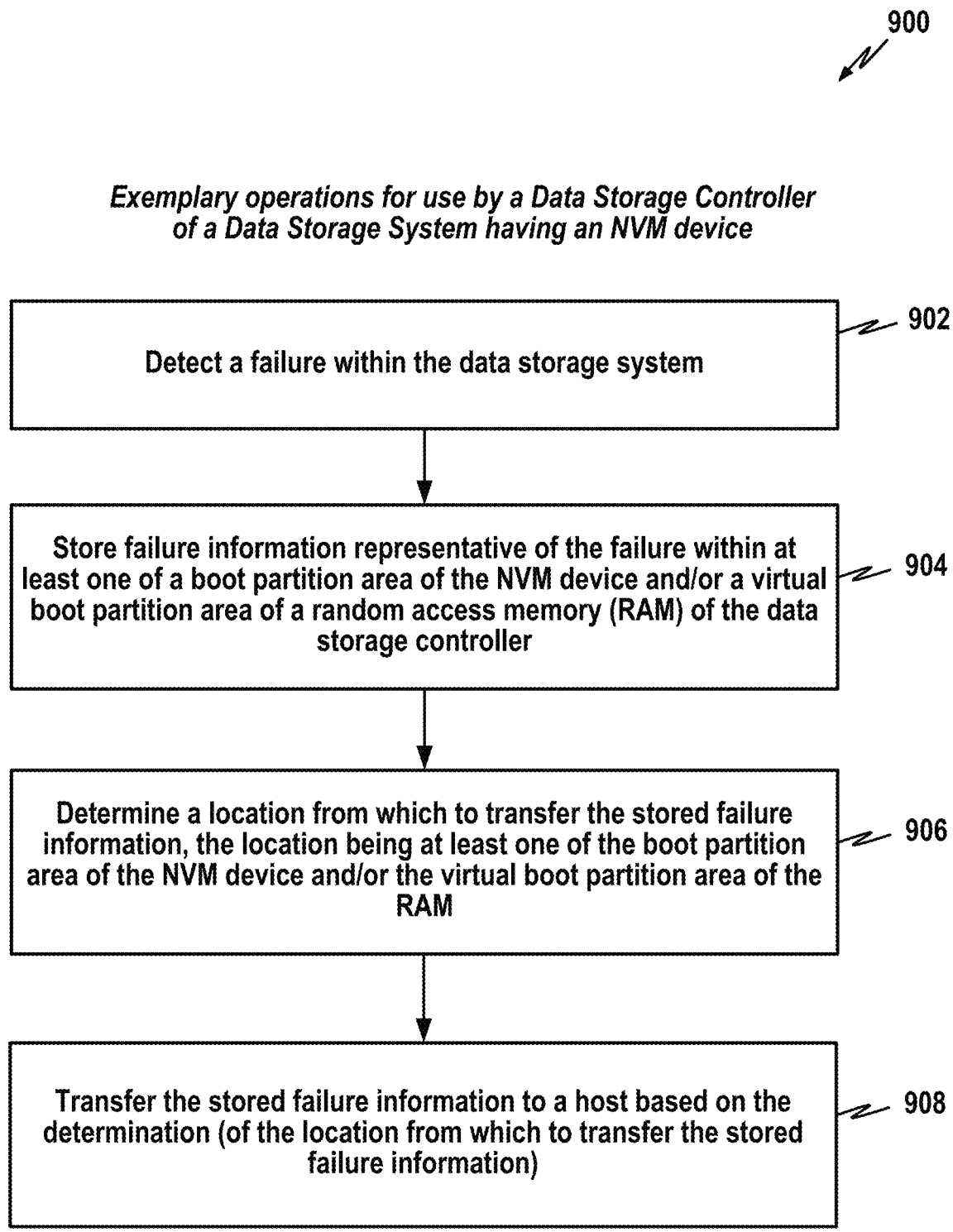
FIG. 9 is a flow chart summarizing selected operations of a data storage controller or other suitable device equipped to store system failure information in a boot partition.
Figure 10:
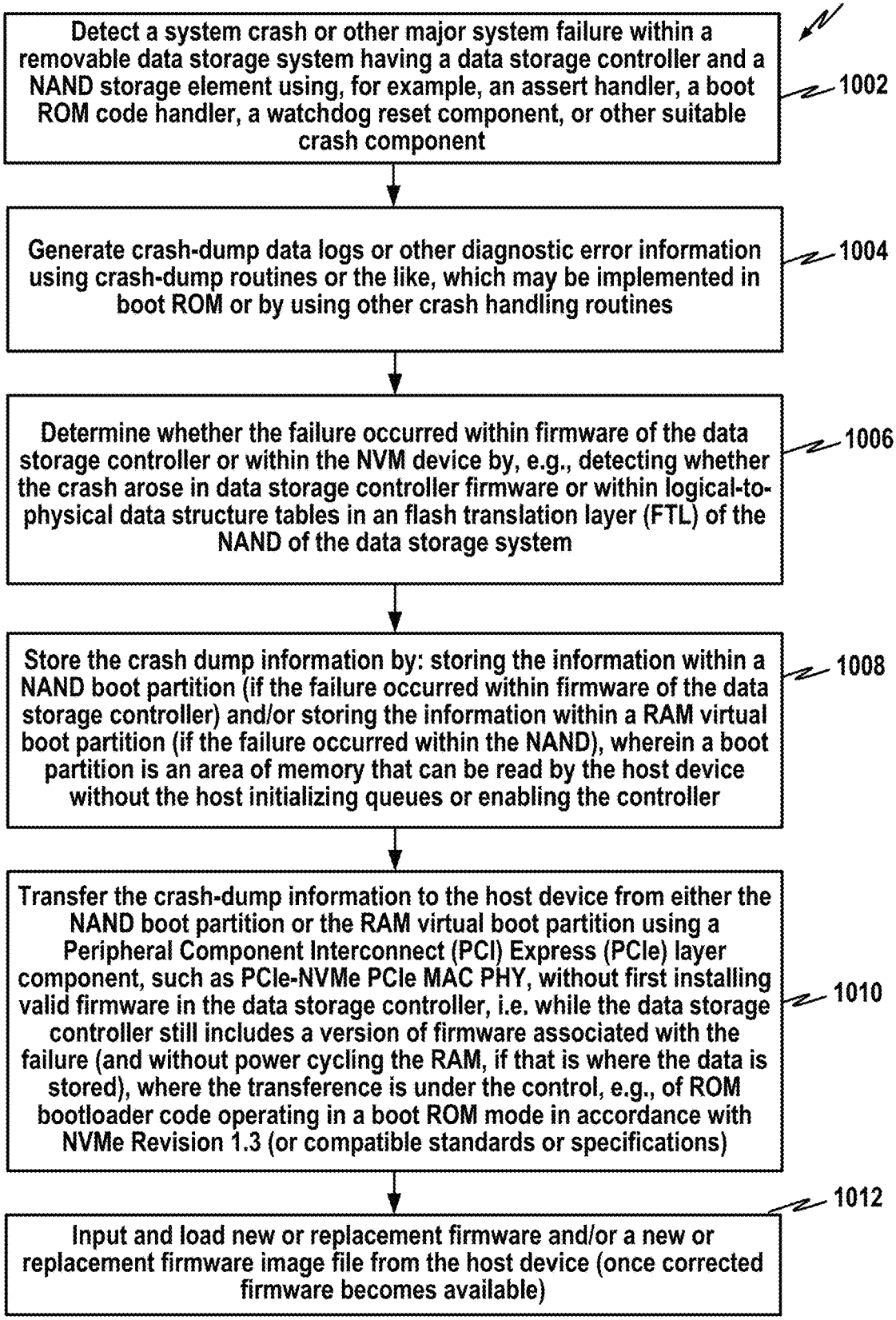
FIG. 10 is a flow chart summarizing further selected operations of a data storage controller or other suitable device equipped to store diagnostic information in boot partitions.

FIGS. 8-10 illustrate and summarize various general features of exemplary data storage controllers and methods, or procedures for use with data storage controllers.

FIG. 8 shows an exemplary data storage controller 800 (or memory controller or device controller) configured to communicate with a host device 802 and a NVM data storage device 804, wherein the data storage controller 800 may access the data storage device 804 based on commands issued to the data storage controller 800 by the host device 802. In the example, of FIG. 8, the NVM data storage device includes a boot partition 805. Although many examples described herein relate to PCIe-NVMe controllers for storing data within NAND devices, the data storage device 804 may be any suitable memory or storage device and is not limited to NANDs, and the data storage controller 800 may be any suitable memory controller device and is not limited to PCIe-NVMe-based controllers.

The exemplary data storage controller 800 of FIG. 8 includes a host interface 806 (such as a PCIe-NVMe PCIe MAC PHY interface) and a RAM 808, which may be configured to include a virtual boot partition 809. The data storage controller 800 also includes a processing system 810 having a failure detector (or failure detection system or circuit) 812 for detecting a failure within the data storage system (such as a system crash). The processing system 810 includes a failure-responsive data storage controller (or control system or circuit) 814 configured to store information representative of the failure within at least one of the boot partition area 805 of the NVM device 804 and/or the virtual boot partition area 809 of the RAM 808. The processing system 810 also includes a determination component, circuit or system 816 configured to determine a location from which to transfer the stored failure information, the location being at least one of the boot partition area 805 of the NVM data storage device 804 and/or the virtual boot partition area 809 of the RAM 808. Still further, the processing system 810 includes a transference controller 818 configured to transfer the stored information (from either the RAM or the NVM) to the host device based on the determination (of the location from which to transfer the stored information).

In at least some examples, means may be provided for performing the functions illustrated in FIG. 8 and/or other functions illustrated or described herein. For example, an apparatus (e.g. data storage controller 800) may be provided for use with a host device (e.g. host 802) and an NVM data storage device (e.g. storage device 804) where the apparatus includes: means (such as component 812) for detecting a failure within the data storage system; means (such as component 814) for storing information representative of the failure within at least one of a boot partition area of the NVM device and/or a virtual boot partition area of a random access memory (RAM) of the data storage controller; means (such as component 816) for determining a location from which to transfer the stored failure information, the location being at least one of the boot partition area of the NVM device and/or the virtual boot partition area of the RAM; and means (such as component 818) for transferring the stored information to the host based on the determination. The means for storing may include: means (such as crash hander 118 of FIG. 1) for determining whether the failure occurred within firmware of the data storage controller or within the NVM device; means (such as component 512 of FIG. 5) for storing the information within the boot partition area of the NVM device if the failure occurred within a firmware component of the data storage controller; and means (such as component 512 of FIG. 5) for storing the information within the virtual boot partition area of the RAM if the failure occurred within the NVM device.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms. These are just some examples of suitable means for performing or controlling the various functions.

In at least some examples, a machine-readable storage medium may be provided having one or more instructions which when executed by a processing circuit causes the processing circuit to performing the functions illustrated in FIG. 8 and/or other functions illustrated or described herein. For example, instructions may be provided for detecting a failure within the data storage system. Instructions may be provided for storing information representative of the failure within a boot partition area of the NVM device and/or within a virtual boot partition area of a random access memory (RAM) of the data storage controller. Additional instructions may be provided for determining whether to transfer the stored information to a host device from the boot partition area of the NVM device or from the virtual boot partition area of the RAM. Still further instructions may be provided for transferring the stored information to the host device based on the determination.

FIG. 9 broadly summarizes exemplary operations 900 for use by or with a data storage system having a data storage controller or other suitable control device and an NVM storage device, such as a NAND. Briefly, at 902, the data storage controller detects a failure within the data storage system. At 904, the data storage controller stores failure information representative of the failure within at least one of a boot partition area of the NVM device and/or a virtual boot partition area of a random access memory (RAM) of the data storage controller. At 906, the data storage controller determines a location from which to transfer the stored failure information, the location being at least one of the boot partition area of the NVM device and/or the virtual boot partition area of the RAM. At 908, the data storage controller transfers the stored failure information to a host device based on the determination (of the location from which to transfer the stored failure information).

FIG. 10 further summarizes exemplary operations 1000 for use by or with a data storage system having a data storage controller and NAND. At 1002, the data storage controller detects a system crash or other major system failure within a removable data storage system having a data storage controller and a NAND storage element using, for example, an assert handler, a boot ROM code handler, a watchdog reset component, or other suitable crash handler. At 1004, the data storage controller generates crash-dump data logs or other diagnostic error information using crash-dump routines or the like, which may be implemented in boot ROM or by using other crash handling components. At 1006, the data storage controller determines whether the failure occurred within firmware of the data storage controller or within the NVM device by, e.g., detecting whether the crash arose in data storage controller firmware or within logical-to-physical data structure tables in an FTL of the NAND of the data storage system. At 1008, the data storage controller stores the crash-dump information by: storing the information within a NAND boot partition (if the failure occurred within firmware of the data storage controller) and/or storing the information within a RAM virtual boot partition (if the failure occurred within the NAND), wherein a boot partition is an area of memory that can be read by the host device without the host initializing queues or enabling the controller. At 1010, the data storage controller transfers (or allows the transference of) the crash-dump information to the host device from either the NAND boot partition or the RAM virtual boot partition using a PCIe layer component, such as PCIe-NVMe PCIe MAC PHY, without first installing (or reinstalling) valid firmware in the data storage controller, i.e. while the data storage controller still includes a version of firmware associated with the failure, (and without power cycling the RAM, if that is where the data is stored), where the transference is under the control, e.g., of ROM bootloader code operating in a boot ROM mode in accordance with NVMe Revision 1.3 (or compatible standards or specifications). At 1012, the data storage controller inputs and loads new or replacement firmware and/or a new or replacement firmware image file from the host device (once corrected firmware becomes available).

The subject matter described herein can be implemented in any suitable NAND flash memory, including 2D or 3D NAND flash memory. Semiconductor memory devices include volatile memory devices, such as DRAM) or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon. The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two dimensional and three dimensional exemplary structures described but cover all relevant memory structures within the spirit and scope of the subject matter as described herein and as understood by one of skill in the art.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Furthermore, as used herein, a phrase referring to "at least one of" a list of items refers to any combination of those items, including single members. By way of example, "at least one of: A, B, or C" is intended to cover A, B, C, A-B, A-C, B-C, and A-B-C, as well as multiples of the same members (e.g., any lists that include AA, BB, or CC). Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Various details of the presently disclosed subject matter may be changed without departing from the scope of the presently disclosed subject matter. Furthermore, the foregoing description is for the purpose of illustration only, and not for the purpose of limitation.

What is claimed is:

1. A method for use by a data storage system including a data storage controller and a non-volatile memory (NVM) device, the method comprising:
   detecting a failure within the data storage system;
   storing failure information representative of the failure within a boot partition area of the data storage system, the boot partition accessible by a host device without the host device enabling the data storage controller, the boot partition including at least one of an NVM boot partition of the NVM device and a volatile memory boot partition of a volatile memory of the data storage system;

determining, in response to an access attempt by the host device, a location within the boot partition of the data storage system from which to transfer the stored failure information to the host device, the location within at least one of the NVM boot partition and the volatile memory boot partition; and transferring the stored failure information to the host device based on the determination.

2. The method of claim 1, wherein detecting the failure within the data storage system includes detecting a system crash, and wherein the failure information representative of the failure includes crash-dump information.

3. The method of claim 1, wherein storing the failure information comprises:

determining whether the failure occurred within firmware of the data storage controller or within the NVM device;

storing the failure information within the NVM boot partition of the NVM device in response to a determination that the failure occurred within a firmware component of the data storage controller; and storing the failure information within the volatile memory boot partition of the volatile memory in response to a determination that the failure occurred within the NVM device.

4. The method of claim 3, wherein transferring the stored failure information, comprises:

transferring the failure information from the NVM boot partition of the NVM device in response to the determination that the failure occurred within the firmware component of the data storage controller; and transferring the failure information from the volatile memory boot partition of the volatile memory in response to the determination that the failure occurred within the NVM device.

5. The method of claim 1, wherein determining the location from which to transfer the stored failure information comprises detecting whether the failure information was stored in the NVM boot partition of the NVM device or in the volatile memory boot partition of the volatile memory.

6. The method of claim 1, wherein the failure occurred within data storage controller firmware and wherein transferring the stored failure information to the host device is performed while the data storage controller still includes the firmware that failed.

7. The method of claim 1, wherein the data storage system includes a Non-Volatile Memory express (NVMe) read only memory (ROM) bootloader, and wherein transferring the stored failure information to the host device is performed under the control of the NVMe ROM bootloader.

8. The method of claim 1, wherein transferring the stored failure information to the host device includes transferring the failure information from the volatile memory boot partition in response to a determination that the data storage controller has not lost power since the failure information was stored in the volatile memory boot partition.

9. A data storage system for use with a host device, comprising:

a non-volatile memory (NVM) device; and a processing system including a data storage controller and a volatile memory, the processing system configured to detect a failure within the data storage system, store failure information representative of the failure within a boot partition of the data storage system, the boot partition accessible by the host device without the host device enabling the data storage controller, the boot partition including at least one of an NVM boot partition within the NVM device and a volatile memory boot partition within the volatile memory, identify, in response to an access attempt by the host device, a location from which to transfer the stored failure information to the host device, the location within at least one of the NVM boot partition of the NVM device and the volatile memory boot partition of the volatile memory, and transfer the stored failure information to the host device based on the identified location.

10. The data storage system of claim 9, wherein the processing system includes a system crash handler configured to generate crash-dump information.

11. The data storage system of claim 10, wherein the system crash handler is configured to determine whether the failure occurred either within a firmware component of the data storage controller or within the NVM device, store the crash-dump information within the NVM boot partition of the NVM device if the failure occurred within the firmware component of the data storage controller, and store the crash-dump information within the volatile memory boot partition of the volatile memory if the failure occurred within the NVM device.

12. The data storage system of claim 9, wherein the data storage controller includes components configured in accordance with Non-Volatile Memory express (NVMe), wherein the failure occurred within firmware of the data storage controller, and wherein the NMVe components are configured to transfer the stored failure information to the host device while the data storage controller includes the firmware that failed.

13. The data storage system of claim 9, wherein the data storage controller includes a Non-Volatile Memory express (NVMe) bootloader configured to transfer the stored failure information to the host device from the boot partition without the host device initializing queues associated with the data storage controller.

14. The data storage system of claim 9, wherein the data storage system is a removable data storage system that can be removably coupled to the host device.

15. A data storage system for use with a host device, comprising:

a non-volatile memory (NVM) device; and a processing system including a data storage controller, a random access memory (RAM), a failure detector configured to detect a failure within the data storage system, a failure-responsive data storage controller configured to store failure information representative of the failure within a boot partition of the data storage system, the boot partition accessible by the host device without the host device enabling the data storage controller, the boot partition including at least one of an NVM boot partition of the NVM device and a virtual boot partition of the RAM, a determination component configured to determine, in response to an access attempt by the host device, a location from which to transfer the stored failure information to the host device, the location within at least one of the NVM boot partition of the NVM device and the virtual boot partition of the RAM, and a transference controller configured to transfer the stored failure information to the host device based on the determination made by the determination component.

16. The data storage system of claim 15, wherein the processing system further includes a read only memory (ROM) bootloader configured to transfer the stored failure information to the host device without the host device enabling queues associated with the data storage controller.

17. An apparatus for use in a data storage system having a non-volatile memory (NVM) device and a volatile memory, comprising:
   means for processing host access requests to the NVM device;
   means for establishing a boot partition, the boot partition accessible by a host device without the host device enabling the means for processing, the boot partition including at least one of an NVM boot partition established within the NVM device and a volatile memory boot partition established within the volatile memory;
   means for detecting a failure within the data storage system;
   means for storing failure information representative of the failure at a location within the boot partition;
   means, operative in response to an access attempt by the host device, for determining a location from which to transfer the stored failure information, the location within at least one of the NVM boot partition and the volatile memory boot partition; and
   means for transferring the stored failure information to the host device based on the determination.

18. The apparatus of claim 17, further comprising:
   means for determining whether the failure occurred within either a firmware component of a data storage controller of the data storage system or within the NVM device;
   means for storing the failure information within the NVM boot partition if the failure occurred within the firmware component of the data storage controller; and
   means for storing the failure information within the volatile memory boot partition if the failure occurred within the NVM device.

19. The method of claim 1, wherein the data storage controller is configured to be enabled by the host device by at least one of (a) initializing command queues associated with the data storage controller and (b) controlling the data storage controller to boot up an operating system of the data storage controller.

20. The method of claim 1, wherein the volatile memory boot partition is a virtual boot partition within the volatile memory.

21. The data storage system of claim 9, wherein the data storage controller is configured to be enabled by the host device by at least one of (a) initializing command queues associated with the data storage controller and (b) controlling the data storage controller to boot up an operating system of the data storage controller.

22. The data storage system of claim 9, wherein the volatile memory boot partition is a virtual boot partition configured within the volatile memory.

23. The data storage system of claim 15, wherein the data storage controller is configured to be enabled by the host device by at least one of (a) initializing command queues associated with the data storage controller and (b) controlling the data storage controller to boot up an operating system of the data storage controller.

24. The data storage system of claim 15, wherein the processing system includes a Non-Volatile Memory express (NVMe) bootloader configured to transfer the stored failure information to the host device without the host device enabling the data storage controller.

25. The apparatus of claim 17, wherein the means for processing comprises a data storage controller configured to be enabled by the host device by at least one of (a) controlling the data storage controller to boot up an operating system of the data storage controller and (b) initializing command queues associated with the data storage controller.

* * * * *